Patented July 31, 1951

2,562,204

UNITED STATES PATENT OFFICE 2,562,204

PROCESS FOR PRODUCING FLEXIBLE HOLLOW PLASTIC ARTICLES

Clare L. Milton, Jr., Akron, Ohio, assignor to the United States of America as represented by the Secretary of the Army No Drawing. Application February 2, 1948, Serial No. 5,714

5 Claims. (Cl. 18—58)

(Granted under the act of March 3, 1883, as amended April 30, 1928; 370 O. G. 757)

The invention described herein may be manufactured and used by or for the Government for governmental purposes, without payment to me of any royalty thereon.

This invention provides an improved process for producing flexible hollow plastic articles.

Numerous attempts have been made to formulate compositions combining the toughness of plasticized vinyl chloride polymers and their resistance to deterioration in service with thermosetting or vulcanizable materials. Typical of these have been mixtures of diallyl phthalate, an ester plasticizer, and a polyvinyl chloride, or of the last two ingredients with an acrylonitrile-butadiene synthetic rubber and appropriate vulcanizing ingredients.

Heretofore these attempts have yielded products useful for certain purposes, but possessing certain shortcomings which the present invention overcomes. For example, the allyl esters are difficult to polymerize and require expensive curing cycles or excessive catalyst concentrations, and the resulting products usually are incompatible with the chlorine-containing resins. The butadiene-acrylonitrile rubber mixtures are necessarily limited in color range and are notoriously poor with respect to retention of shade or aging as well as to transparency.

It has been found in accordance with the present invention that mixtures of suitable vinyl chloride resins, one or more ester-type plasticizers and a diacrylate or dimethacrylate of triethyleneglycol or tetraethyleneglycol with an oxygen-yielding catalyst, such as, an organic peroxide, an organic perborate, or hydrogen peroxide catalyst possess none of the above-mentioned shortcomings, curing readily at low catalyst concentrations to yield tough compositions of virtually unlimited color range, which are transparent at proper ratios of ingredients.

Although it is not essential to the process of the present invention, it is preferred to use a resin of high molecular weight containing at least 93 per cent, and preferably 97.5 per cent or over, that is, up to 100 per cent, of vinyl chloride of such characteristics that when dispersed in an equal volume of plasticizer, a fluid or semi-fluid paste is formed. Then by addition of the difunctional acrylate or methacrylate the viscosity is reduced and ease of application is increased.

Application of mixtures of this type from solutions also is useful, in which case resins of lower molecular weight and vinyl chloride content are found most useful. Such compositions are especially valuable for fabric coating, and in conjunction with a polyester plasticizer.

While the invention is not necessarily so limited, it is illustrated by the following illustrative examples which represent typical embodiments of the invention. The amounts indicated in each are parts by weight.

Example I

| | Parts |
|---|---|
| Vinylite VYNV-2 | 100 |
| Di-2-ethylhexylphthalate | 100 |
| Dimethacrylate of tetraethyleneglycol | 40 |
| Lauroyl peroxide | 0.4 |

Example II

| | Parts |
|---|---|
| Vinylite VYNV-2 | 100 |
| Dimethacrylate of tetraethyleneglycol | 50 |
| Lauroyl peroxide | 0.5 |
| Paraplex G-25 | 130 |

Example III

| | Parts |
|---|---|
| Geon 100 x 210 | 100 |
| Di-2-ethylhexyl sebacate | 100 |
| Triethyleneglycol diacrylate | 30 |
| T-butyl perbenzoate | 0.2 |

In the above examples, Vinylite VYNV-2 is a vinyl chloride-vinyl acetate copolymer, containing about 97.5% vinyl chloride, dispersible in the plasticizer, manufactured by the Carbide and Carbon Chemicals Co., New York, New York.

Geon 100 x 210 is a vinyl chloride polymer, produced by B. F. Goodrich Chemical Co., Cleveland, Ohio.

It is desired to employ a vinyl chloride resin of the above-indicated character wherein the vinyl chloride content ranges from substantially 93 per cent to substantially 100 per cent.

Paraplex G-25 is a polyester plasticizer, produced by Resinous Products and Chemicals Company.

Additional stabilizers, lubricants, fillers, and colors may be added to these, or similar compositions, through amines, quinones, hydro-quinones, and other inhibitors of polymerization must be avoided. Also diacrylates and dimethacrylates of mixed polyethyleneglycols having an average molecular weight between 100 and 200 for the glycol constituent may be employed.

The compositions described are suitable for making flexible replicas of objects by casting the compositions in the molds duplicating surface characteristics of a model object to be duplicated.

The compositions have the viscosity of a rather thin library paste. Where the compositions are to be used for producing molded replicas, the procedure consists in deaerating the paste by the application of a vacuum, and pouring it into a mold of suitable configuration. An additional deaerating step may be carried out at that point, if desired. The mold is heated to the boiling point of water for a period of between five and forty-five seconds, depending on the gelation time of the resinous composition employed. At the end of this period, the mold is chilled, and the uncongealed paste is drained from it as thoroughly as possible at room temperature. The mold is subsequently drained at 65° C. and at 90° C. for a typical composition. Drainage of the liquid paste is very substantially complete, practically the only plastic being left in the mold is that which gelled on application of heat. At this stage, the plastic is entirely too weak for handling, and its physical properties can be improved only slightly by prolonged exposure to temperatures in the neighborhood of 100° C. However, an exposure of the gelled plastic in the mold to a temperature range of from approximately 90° C. to approximately 120° C. for a period of time ranging from about five minutes to about an hour, is necessary in order to complete the polymerization of the methacrylate or acrylate. The length of time required is inverse to the temperature, that is to say, the higher the temperature is maintained, the shorter will be the time of exposure. In order to develop the ultimate strength of the material, exposure to a much higher temperature is necessary. For this purpose, a temperature of 380° F. is preferred, although the curing temperature depends upon the characteristics of the resin used, and the nature of the plasticizers employed, it varying in practice between about 320° F. and 420° F. The heating may be effected conveniently by immersing the mold in a pot of oil or glycerine maintained at the desired temperature. An alternate procedure is to conduct the fusion at 380° F. in a circulating air oven for approximately five minutes, followed by three minutes' immersion in the heat transfer liquid.

The articles formed from the compositions described are found to possess improved abrasion resistance, and also exhibit a remarkable toughness and very high resistance to tearing.

From the above, it will be apparent that the invention is not limited necessarily to the use of the particular compositions specifically set forth herein, but that such composition may be varied both as to proportions and constituents, particularly the plasticizers employed, without departing from the inventive concept, and accordingly, it will be understood that it is intended and desired to include within the scope of the invention such modifications and changes as may be necessary to adapt it to varying conditions and uses, as defined by the appended claims.

Having thus described my invention, what I claim as new and wish to secure by Letters Patent is:

1. The process of producing flexible, hollow, plastic articles characterized by high toughness and high resistance to tearing, which comprises preparing a hollow, non-porous, seamless mold for the articles, introducing into the mold a thermosetting plastisol composition comprising a vinyl chloride polymer resin containing at least 93 per cent of vinyl chloride, a non-polymerizing polyester plasticizer for the resin, an acrylate compound selected from the group consisting of diacrylates and dimethacrylates of mixed polyethyleneglycols having an average molecular weight of between 100 and 200 for the glycol constituent of the compound, and an oxygen-liberating catalyst selected from the group consisting of organic peroxides and hydrogen peroxide heating the mold containing the composition to gelation temperature of the composition, maintaining the mold at the said temperature until the composition has gelled on the surfaces of the mold, draining ungelled composition from the mold, completing polymerization of the acrylate compound, and developing maximum strength and tear-resistance in the resulting molded article by heating the molded article while in the mold to a temperature between approximately 320° F. and 420° F. until maximum toughness and tear-resistance have been developed.

2. The process of producing flexible, hollow, plastic articles characterized by high toughness and high resistance to tearing, which comprises preparing a hollow mold for the articles, introducing into the mold at room temperature a thermosetting plastisol composition consisting essentially of vinyl chloride polymer resin containing from approximately 93 per cent to 100 per cent vinyl chloride, 100 parts by weight; di-2-ethylhexylphthalate, 100 parts by weight; tetraethyleneglycol dimethacrylate, 40 parts by weight; lauroyl peroxide 0.4 part by weight; deaerating the composition in the mold, heating the mold and composition to gelation temperature of the composition, maintaining the mold at the said temperature until the composition has gelled on the surfaces of the mold, cooling the mold, pouring ungelled plastisol composition from the mold while leaving gelled resinous material undisturbed in the mold, reheating the mold and gelled resinous material therein, maintaining the resulting gelled resin in the mold at a sufficient temperature for a sufficient time to complete polymerization of the dimethacrylate, and developing maximum strength and tear-resistance in the gelled composition by heating the composition in the mold to a temperature of from approximately 320° F. to 420° F. until maximum strength and tear-resistance have been developed.

3. The process of producing flexible, hollow, plastic articles characterized by high toughness and high resistance to tearing, which comprises preparing a hollow mold for the articles, introducing into the mold a thermosetting plastic composition consisting essentially of vinyl chloride polymer resin containing approximately 97.5 per cent vinyl chloride, 100 parts by weight; di-2-ethylhexyl sebacate, 100 parts by weight; triethyleneglycol diacrylate, 30 parts by weight; t-butyl perbenzoate, 0.2 part by weight; heating the mold and composition to approximately 100° C. to effect gelation of the composition, maintaining the mold at the said temperature until the composition has gelled on the surfaces of the mold, heating the resulting gelled composition to temperature of from approximately 90° C. to approximately 120° C. until polymerization of the diacrylate is completed, and developing maximum strength and tear-resistance in the gelled composition by heating the composition to approximately 380° F., maintaining the temperature until maximum strength and tear-resistance have been developed, and removing the resulting article from the mold.

4. The process of producing flexible, hollow, plastic articles characterized by high strength and high resistance to tearing, which comprises preparing a hollow mold for the articles, introducing into the mold a thermosetting plastic composition consisting essentially of a vinyl chloride polymer resin of from approximately 93 per cent to approximately 100 per cent vinyl chloride, approximately 100 parts by weight; a polyester plasticizer, 130 parts by weight; tetraethyleneglycol dimethacrylate, 50 parts by weight; and lauroyl peroxide 0.5 part by weight; heating the mold and composition to approximately 100° C. until the composition peripherally gels in the mold, heating the resulting gelled composition to a sufficient temperature for a sufficient length of time to complete polymerization of the dimethacrylate, and developing maximum strength and tear-resistance in the gelled composition by heating it in the mold to approximately 380° F. in a circulating air oven and then immersing the mold for from approximately three to four minutes at that temperature in a high-boiling heat exchange liquid, and coloring the resulting molded articles.

5. The process of producing flexible, hollow, plastic articles, characterized by high toughness and high resistance to tearing, which comprises preparing a hollow non-porous, seamless mold for the articles, introducing into the mold at room temperature a thermosetting plastisol composition comprising a vinyl chloride polymer resin containing at least 93 per cent of vinyl chloride, a non-polymerizing polyester plasticizer for the resin, an acrylate compound selected from the group consisting of diacrylates and dimethacrylates of mixed polyethyleneglycols having an average molecular weight of between 100 and 200 for the glycol constituent of the compound, and an oxygen-liberating catalyst selected from the group consisting of organic peroxide and hydrogen peroxide, deaerating the composition in the mold, heating the mold to gelation temperature of the composition, cooling the mold, pouring ungelled plastisol composition from the mold while leaving gelled resinous material undisturbed in the mold as a temporary lining therefor, reheating the mold and gelled resin-out material, maintaining the mold at the gelation temperature until the composition has gelled on the surface of the mold, maintaining the mold at a temperature and for a time sufficient to complete polymerization of the acrylate compound, and developing maximum strength and tear-resistance in the resulting molded article by heating the molded article while in the mold to a temperature between 320° F. and 420° F. until maximum toughness and tear-resistance have been developed.

CLARE L. MILTON, Jr.

REFERENCES CITED

The following references are of record in the file of this patent:

UNITED STATES PATENTS

| Number | Name | Date |
|---|---|---|
| 2,101,107 | Strain | Dec. 7, 1937 |
| 2,155,590 | Garvey | Apr. 25, 1939 |
| 2,161,281 | Carter | June 6, 1939 |
| 2,468,094 | Marks | Apr. 26, 1949 |
| 2,473,722 | Nelson | June 21, 1949 |
| 2,473,723 | Nelson | June 21, 1949 |